(12) United States Patent
Belhadj-Yahya et al.

(10) Patent No.: US 7,099,582 B2
(45) Date of Patent: Aug. 29, 2006

(54) METHOD AND APPARATUS FOR MULTI-PROTOCOL AND MULTI-RATE OPTICAL CHANNEL PERFORMANCE MONITORING

(75) Inventors: Chedley Belhadj-Yahya, Holmdel, NJ (US); David S. Levy, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 696 days.

(21) Appl. No.: 10/160,596

(22) Filed: May 31, 2002

(65) Prior Publication Data

US 2003/0223746 A1 Dec. 4, 2003

(51) Int. Cl.
*H04B 10/08* (2006.01)

(52) U.S. Cl. .......................... 398/27; 398/25; 398/154; 398/155; 359/128; 714/751; 714/47; 714/55; 714/57; 714/131; 370/333

(58) Field of Classification Search ................ 359/128; 714/751, 47, 55, 57, 131; 398/27, 25, 154, 398/155; 370/333
See application file for complete search history.

(56) References Cited

U.S. PATENT DOCUMENTS 6,775,799 B1 * 8/2004 Giorgetta et al. ........... 714/751
2002/0105696 A1 * 8/2002 Halgren ...................... 359/128

* cited by examiner

*Primary Examiner*—David C. Payne

(57) ABSTRACT

A method and apparatus for optical performance monitoring that provides for multi-rate and multi-protocol monitoring includes, identifying a protocol associated with each of a plurality of communication signals using respective data rates extracted therefrom, determining, for each of the plurality of communication signals, a respective bit-error rate (BER), and generating an alarm indicative of BER excursions beyond a protocol appropriate BER threshold level.

9 Claims, 3 Drawing Sheets

METHOD AND APPARATUS FOR MULTI-PROTOCOL AND MULTI-RATE OPTICAL CHANNEL PERFORMANCE MONITORING

FIELD OF THE INVENTION

This invention relates to the field of optical communications and, more specifically, to signal monitoring.

BACKGROUND OF THE INVENTION

There is a growing trend toward all-optical re-configurable networks promising higher levels of data-rate and protocol transparency. However, in order to maintain these higher performance levels, signal quality monitoring must be provided at the optical layer. In such systems measurement of optical parameters is critical as it provides vital information regarding the performance of the system. Such information can then be used for diagnosis and repair of an optical network or for performance of optimization actions. One standard measurement of signal quality in optical systems has been the bit error rate (BER) of a system. The BER of a system is affected by two forms of signal degradation, noise and distortion. The measurement of such parameters must be accurate, have a wide range, and be performed in a timely manner so as to provide the necessary information in the shortest amount of time for the appropriate actions.

Some techniques used for monitoring optical signal quality include spectral analyzing and sampling. The conventional approach to analyzing the optical parameters of a spectrally dependent system is to use an optical spectrum analyzer. These systems are generally based on an optical tool known as a monochromater. Monochromater-based optical spectrum analyzers are typically slow, large in size for most embedded and field applications, and tend to drift with time, giving poor absolute accuracy. The sampling method on the other hand, is the only method that accounts for both noise and distortion and thus comes closest to BER measurement. Unfortunately, previous implementations of sampling methods have been very complicated, slow, and are limited to a single data rate and a single protocol.

SUMMARY OF THE INVENTION

The invention advantageously provides a method and apparatus for optical performance monitoring that provides for multi-rate and multi-protocol monitoring.

In an embodiment of the invention, a method for multi-protocol and multi-rate optical performance monitoring includes, identifying a protocol associated with each of a plurality of communication signals using respective data rates extracted therefrom, determining, for each of the plurality of communication signals, a respective bit-error rate (BER), and generating an alarm indicative of BER excursions beyond a protocol appropriate BER threshold level.

In another embodiment of the invention an apparatus for multi-protocol and multi-rate optical signal performance monitoring includes, a plurality of multi-protocol processors (MPPs), for identifying a protocol associated with each of a plurality of communication signals using respective data rates extracted therefrom, and for determining, for each of the plurality of communication signals, a respective bit-error rate (BER), and a controller, for generating an alarm indicative of BER excursions beyond a protocol appropriate threshold level appropriate to the associated protocol.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention advantageously provides a method and apparatus for optical performance monitoring that provides for multi-rate and multi-protocol monitoring.

Figure 1:
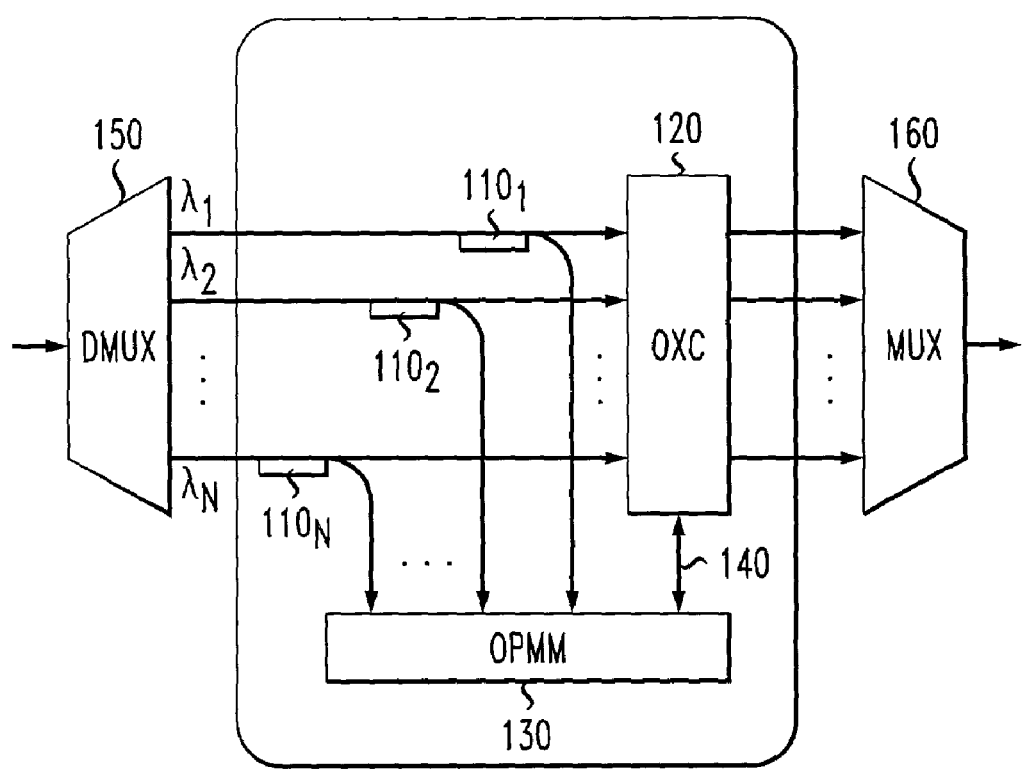
FIG. 1 depicts a high-level block diagram of a typical central office network node.
Figure 2:
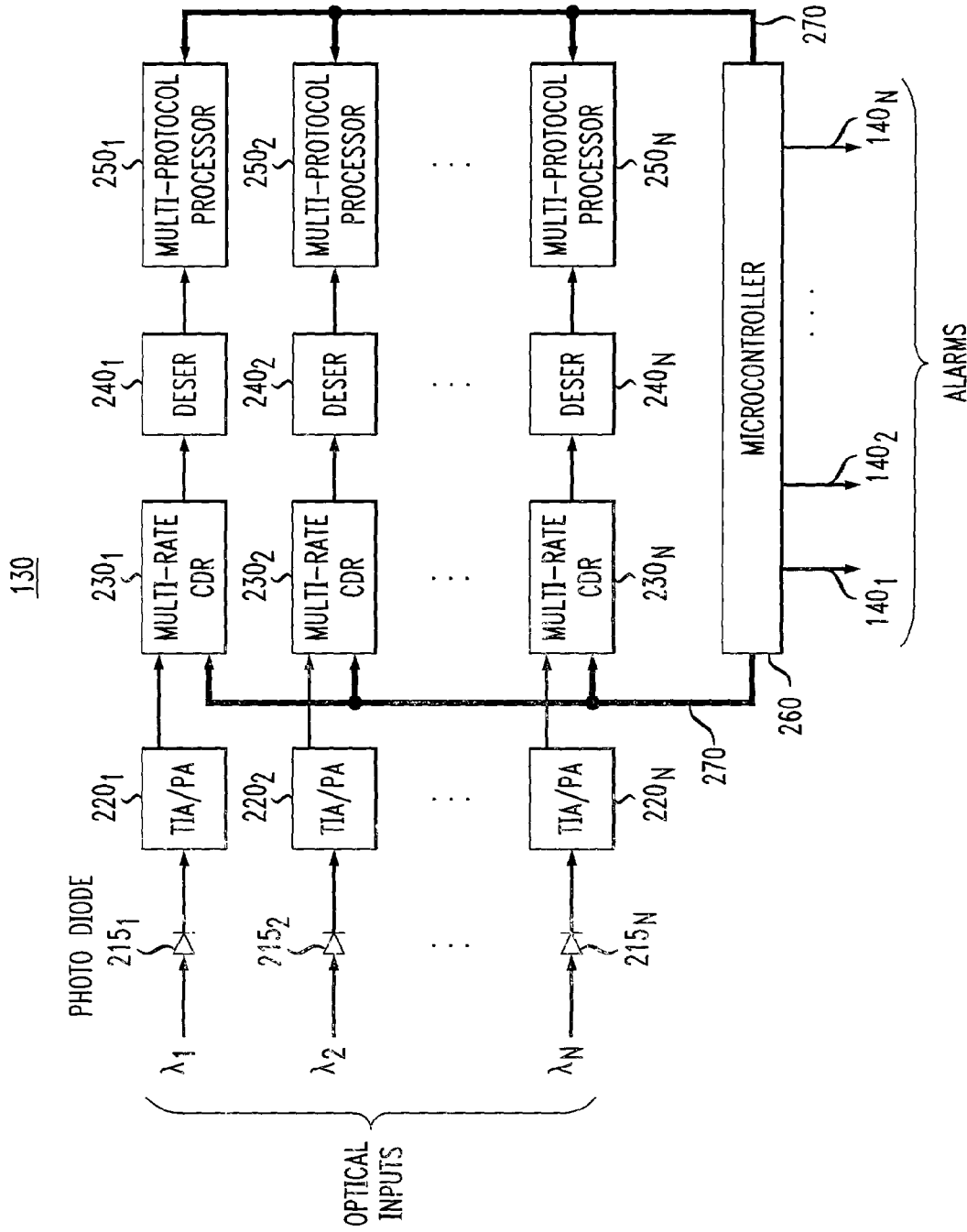
FIG. 2 depicts a high-level block diagram of an embodiment of an optical performance monitoring module suitable for use in the system 100 of FIG. 1.

FIG. 1 depicts a high-level block diagram of a typical central office network node 100. The central office network node 100 of FIG. 1 includes a demultiplexer 150, a plurality of optical signal taps $110_1$–$110_N$ (collectively signal taps 110), an optical performance monitoring module (OPMM) 130, a communications bus 140, an optical cross connect (OXC) switch 120, and a demultiplexer 160. An optical signal is applied to the demultiplexer 150 and is thereby separated into a plurality of wavelengths $\lambda_1$–$\lambda_N$ (collectively optical signals $\lambda$). The optical signals $\lambda$ are sampled using the optical taps 110, and the outputs of the optical taps 110 are applied to individual channels of the OPMM 130. The optical signals $\lambda$ are subsequently applied as inputs to the OXC switch 120. Within the OPMM 130, the sampled optical signals $\lambda$ are conditioned, as will be explained below, and the bit error rate (BER) information for each of the optical signals $\lambda$ is extracted in individual channels of the OPMM 130. Based on the BER information extracted, a micro-controller, or other control device, generates alarms adapted for use as indicators of malfunctions or as control signals to initiate corrective actions to correct for errors in the optical signals evidenced by the BER information obtained. Although the micro-controller of FIG. 2 is depicted as being incorporated within the OPMM 130, the micro-controller can be advantageously employed as a separate component or as a part of other components in a system. Additionally, the photodetectors can be integrated with the TIA/PA, and the CDR can be combined with the DESER on the same chip. In the central office network node 100 of FIG. 1, the alarms or control signals are applied to the OXC 120 via the communications bus 140. The output signals from the OXC 120 are recombined by the multiplexer 160.

FIG. 2 depicts a high-level block diagram of an embodiment of an OPMM suitable for use in the central office network node 100 of FIG. 1. The OPMM 130 includes a plurality of input channels, dependent on the number of signals to be processed. The OPMM 130 of FIG. 2 includes a plurality of wideband photodetectors (PD) $215_1$–$215_N$ (collectively PD 215), a plurality of combination low noise wideband transimpedance/limiting post amplifiers (TIA/PA) 220₁–220ₙ (collectively TIA/PA 220), a plurality of wideband adaptive clock and data recovery (CDR) circuits 230₁–230ₙ (collectively CDR circuits 230), a plurality of deserializers (DESER) 240₁–240ₙ (collectively DESER 240), a plurality of multi-protocol processors (MPP) 250₁–250ₙ (collectively MPP 250), and a micro-controller 260. Although some of the components of the OPMM 130 are depicted as specific devices, other devices performing substantially the same function as the illustrated devices can be substituted for the corresponding devices illustrated. For example, the photodetectors can be integrated on the same chip as the TIA/PA or wideband phototransistors can be used in place of the photodetectors, and bandpass filters with gain can be used in place of the TIA/PA. It should be noted that any specific device used must provide a band wide enough to accommodate the desired multi-protocol and multi-rate optical channel performance monitoring.

Each of the optical signals λ applied to the OPMM 130 are converted to electrical signals by a respective wideband PD 215. Each of the electrical signals is also then amplified by a respective TIA/PA 220 and applied as an input to a corresponding CDR circuit 230. The CDR circuits 230 automatically lock to the incoming data rate to extract clock rates and thereby synchronize the data of each of the respective electrical signals. The CDR circuits 230 have a short lock time, preferably a few milliseconds, for application in high rate optical systems and are optionally programmable. Each of the CDR circuits 230 provides the data rate information to a respective MPP 250. The DESER 240 shown in FIG. 2 are optional and are used to interface between the CDR circuits 230 and the respective MPP 250 to convert serial high-speed data into lower speed parallel data (e.g., one OC-48 bit signal converted into four, OC-12 bit signals) if necessary.

The MPP 250 identify the data protocol by comparing the rate information provided by the CDR circuits 230 to a stored data rate protocol table as depicted in Table 1, which follows:

TABLE 1

| Data Rate in Mb/s | Corresponding Protocol |
| --- | --- |
| 51.84 | SONET (OC-1) |
| 155.52 | SONET (OC-3) |
| 200 | ESCON |
| 622.08 | SONET (OC-12) |
| 1062 | Fibre Channel (FC) |
| 1250 | Gigabit Ethernet (GbE) |
| 2125 | 2 × Fibre Channel |
| 2,488.32 | SONET (OC-48) |
| 9,953.28 | SONET (OC-192) |
| 10,000 | 10 × Gigabit Ethernet (GbE) |
| 10,664.23 | SONET (OC-192) w/FEC |

Table 1 is provided merely for exemplary purposes and it would be appreciated by those skilled in the art that the present invention can be advantageously employed implementing various other protocols. In situations wherein the rates are very close (e.g., OC192 and 10 GbE), a method based on network statistics is used. In this case, the CDR assumes the most probable protocol first (e.g. OC192), followed by the next until the correct protocol is identified by the MPP 250.

Once the protocol is successfully identified, the MPP 250 identify the overhead error bits or BER for each conditioned optical signal from the corresponding CDR circuit 230 or DESER 240 by comparing the data rate of the input, conditioned optical signal to the identified protocol in the stored data rate protocol table. The MPP 250 then communicates the BER information to the micro-controller 260 via the control bus 270. The micro-controller 260 receives the BER information identified by each of the MPP 250 for each conditioned optical signal and compares the identified BER to stored thresholds maintained in a memory of the micro-controller 260. The stored thresholds indicate the acceptable maximums and minimums of BER for particular protocols and, if any of the identified BER from the MPP 250 for each conditioned optical signal do not conform to those stored threshold levels, the micro-controller 260 generates an alarm for the appropriate channel(s).

The alarms are communicated via the plurality of output channels 140₁–140ₙ (collectively output channels 140). The alarms generated by the micro-controller 260 can manifest in the form of an alarm to a user or service provider to indicate the need for repair or a control signal to activate automatic protection switching (i.e., trigger an OXC to switch to an alternate signal channel for further transmission). Additionally, the control signal could be used to optimize system components through feedback circuit (e.g., apply a feedback signal to adjust a tunable/programmable network element settings such as a dispersion compensation module, or optical amplifier). Even further, the control signal generated by the micro-controller 260 could simply be fed to a channel monitor for ultimate display on a display unit. The aforementioned applications of the control signal from the micro-controller 260 are only exemplary and can be used singly or in any combination. Other and various applications for the control signal can be imagined by those skilled in the art and should be considered as included in the present invention.

Figure 3:
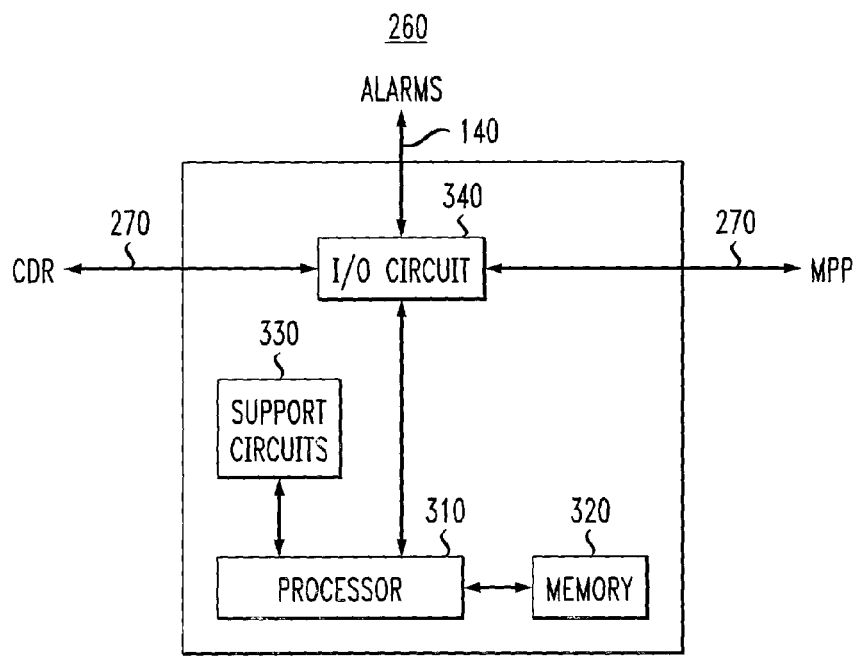
FIG. 3 depicts a high-level block diagram of an embodiment of a micro-controller suitable for use in the optical performance monitoring module of FIG. 2.

FIG. 3 depicts a high-level block diagram of an embodiment of a micro-controller suitable for use in the OPMM 130 of FIG. 2. The micro-controller 260 of FIG. 3 comprises a processor 310 as well as a memory 320 for storing the algorithms and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The micro-controller 260 also contains input-output circuitry 340 that forms an interface between the various functional elements communicating with the micro-controller 260. For example, in the embodiment of FIG. 2, the micro-controller 160 communicates with the MPP 250 and the CDR circuits 230 via the control bus 270 and dispatches the generated alarms via output channels 140.

Although the micro-controller 260 of FIG. 3 is depicted as a general-purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 4:
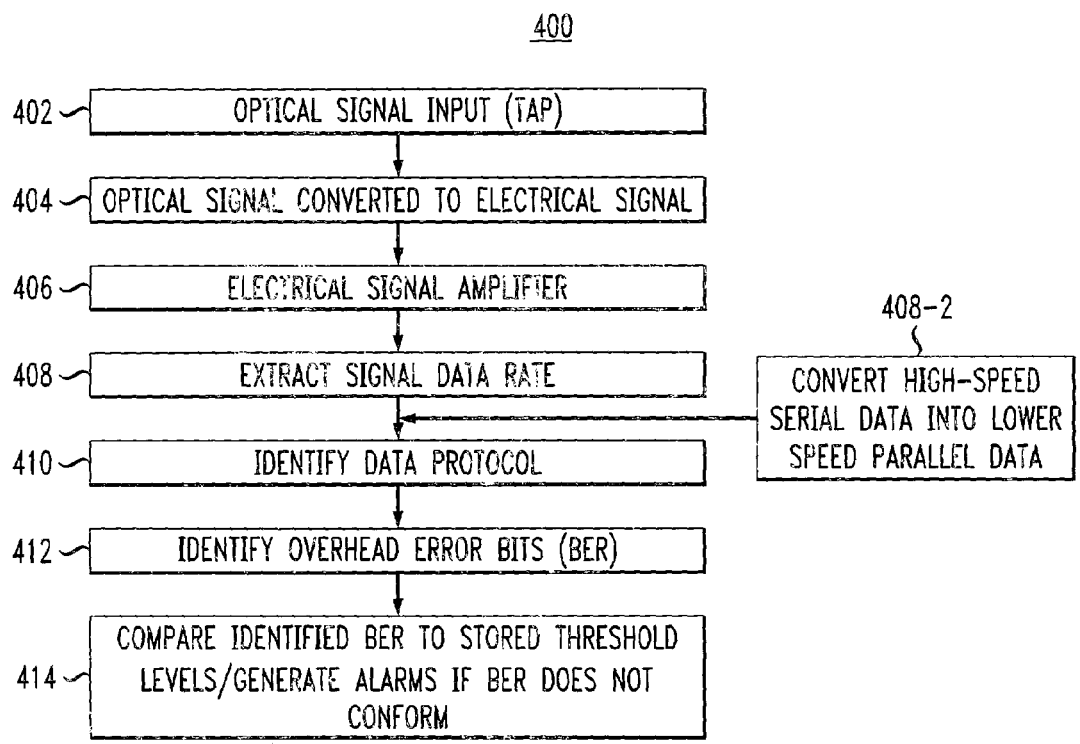
FIG. 4 depicts a flow diagram of a method for multi-protocol and multi-rate optical performance monitoring.

FIG. 4 depicts a flow diagram of one embodiment of a method 400 for achieving multi-protocol and multi-rate optical performance monitoring. The method 400 processes the signals tapped from an optical signal source by identifying the protocol of the optical signals, extracting error information, and producing an alarm in response to any extracted error information, the alarm adapted to indicate an error within an optical signal. Although the method 400 will be described within the context of generating an alarm in response to error information, it will be appreciated by those skilled in the art that the subject invention may be advantageously employed in various methods wherein, for example, an alarm generated in response to error information is not only used to indicate an error with an optical signal, but also to initiate corrective actions within a system.

The method 400 is entered at step 402, when an optical signal from a tap 110 is applied as an input to an OPMM 130.

At step 404, the optical signal from the tap coupled as an input to the OPMM is converted to an electrical signal by a photodetector 215.

At step 406, the electrical signal converted by the photodetector is amplified by a combination low noise, wideband, transimpedance/limiting post amplifier 220.

At step 408, the amplified electrical signal is applied as an input to a CDR circuit 230. The CDR circuit automatically locks to the incoming data rate to extract clock rates and synchronizes the data. The CDR circuit then provides the data rate information to a MPP 250 or, optionally, to a DESER 240.

At step 408-2, the data rate information from the CDR is optionally input to a DESER 240. The DESER 240 converts serial high-speed data into lower speed parallel data if necessary, before the data rate information is processed by the MPP 250.

At step 410, a MPP 250 identifies the data protocol by comparing the rate information provided by the CDR circuit 230 to a stored data rate protocol table as depicted in Table 1 above or as described above, by using network statistics and protocol probability. As mentioned, Table 1 is provided merely for exemplary purposes and it would be appreciated by those skilled in the art that the present invention can be advantageously employed implementing various other protocols.

At step 412, the MPP 250 identifies the overhead error bits (BER) by comparing the data rate of the input, conditioned optical signal to the identified protocol in the stored data rate protocol table. The MPP 250 then communicates the BER information to a micro-controller.

At step 414, the micro-controller 260 receives the BER information identified by the MPP 250 and compares the identified BER to stored thresholds maintained in a memory of the micro-controller 260. The stored thresholds indicate the acceptable maximums and minimums of BER for particular protocols, and if any of the identified BER from the MPP 250 do not conform to those stored threshold levels, the micro-controller 260 generates an alarm for the appropriate channels. The alarm can subsequently be sent to a user or service provider to indicate the error or indicate a need for service or repair.

The above-described method 400 of FIG. 4 provides a general methodology according to the subject invention. As previously noted, although the method 400 of FIG. 4 is described within the context of generating an alarm in response to error information, it will be appreciated by those skilled in the art that the subject invention may be advantageously employed in methods wherein the control signal generated in response to error information is not only used to generate an alarm, but also to initiate corrective actions within a system.

While the forgoing is directed to specific embodiments of the present invention, other and further embodiments of the invention may be devised without departing from the basic scope thereof. As such, the appropriate scope of the invention is to be determined according to the claims, which follow.

What is claimed is:

1. A method, comprising:
   identifying a protocol associated with each of a plurality of communication signals by comparing respective data rates extracted therefrom to a stored data rate within a protocol table;
   determining, for each of the plurality of communication signals, a respective bit-error rate (BER);
   generating an alarm indicative of BER excursions beyond a protocol appropriate BER threshold level associated with the identified protocol;
   sampling each of the plurality of communication signals;
   converting the plurality of communication signals to respective electrical signals;
   amplifying each of the plurality of converted communication signals;
   locking to the plurality of communication signals to extract thereby respective clock rates; and
   converting serial high-speed data of the plurality of communication signals into lower speed parallel data prior to said identifying.

2. The method of claim 1, wherein said protocol table further defines said protocol appropriate BER threshold level.

3. The method of claim 1, wherein said alarm is adapted to alert at least one of a user and a service provider of a communication signal error.

4. The method of claim 1, wherein said alarm is adapted for use as a control signal to initiate corrective action in response to a communication signal error.

5. Apparatus for multi-protocol and multi-rate optical signal performance monitoring, comprising:
   a plurality of multi-protocol processors (MPPs), for identifying a protocol associated with each of a plurality of communication signals using respective data rates extracted therefrom, and for determining, for each of the plurality of communication signals, a respective bit-error rate (BER);
   a controller, for generating an alarm indicative of BER excursions beyond a protocol appropriate threshold level appropriate to the associated protocol;
   a plurality of optical taps, for sampling each of said plurality of communication signals;
   a plurality of photodetectors, for converting each of said plurality of tapped communication signals to electrical signals;
   a plurality of combination transimpedance/limiting post amplifiers (TIA/PA), for amplifying each of said plurality of converted communication signals;
   a plurality of multi-rate clock and data recovery (CDR) circuits, for locking to the incoming data rates of said plurality of communication signals to extract thereby the respective clock rates; and
   a plurality of deserializers (DESER), for convening serial high-speed data of said plurality of communication signals from said plurality of CDR circuits into lower speed parallel data for use by said plurality of MPPs.

6. The apparatus of claim 5, wherein said alarm is adapted to alert at least one of a user and a service provider of a communication signal error.

7. The apparatus of claim 5, wherein said alarm is adapted for use as a control signal to initiate corrective action in response to a communication signal error.

8. Apparatus for multi-protocol and multi-rate optical signal performance monitoring, comprising: means for identifying a protocol associated with each of a plurality of communication signals by comparing respective data rates extracted therefrom to a stored data rate within a protocol table;

means for determining, for each of the plurality of communication signals, a respective bit-error rate (BER);

means for generating an alarm indicative of BER excursions beyond a protocol appropriate BER threshold level associated with the identified protocol;

means for sampling said each of said plurality of communication signals;

means for converting each of said plurality of tapped communication signals to electrical signals;

means for amplifying each of said plurality of converted communication signals;

means for locking to the incoming data rates of said plurality of communication signals to extract thereby the respective clock rates; and means for converting serial high-speed data of said plurality of communication signals into lower speed parallel data prior to said means for identifying.

9. The apparatus of claim 8, wherein said protocol table further defines said protocol appropriate BER threshold level.

* * * * *